United States Patent
Tseng et al.

(10) Patent No.: US 11,454,695 B2
(45) Date of Patent: *Sep. 27, 2022

(54) DYNAMIC POWER POSITIONING METHOD AND DYNAMIC POWER POSITIONING SYSTEM THEREOF

(71) Applicant: GUNITECH CORP., Hsinchu County (TW)

(72) Inventors: Yu-Chee Tseng, Hsinchu County (TW); Ting-Hui Chiang, Hsinchu County (TW); Kai-Cheng Huang, Hsinchu County (TW); Huan-Ruei Shiu, Hsinchu County (TW); Hsin-Yi Kao, Hsinchu County (TW); Chung-Liang Hsu, Hsinchu County (TW)

(73) Assignee: GUNITECH CORP., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,414

(22) Filed: Sep. 29, 2020

(65) Prior Publication Data

US 2021/0181292 A1 Jun. 17, 2021

Related U.S. Application Data

(60) Provisional application No. 62/947,132, filed on Dec. 12, 2019.

(51) Int. Cl.
*H04W 24/00* (2009.01)
*G01S 5/02* (2010.01)
(Continued)

(52) U.S. Cl.
CPC .......... *G01S 5/0284* (2013.01); *G01S 7/4918* (2013.01); *G01S 11/06* (2013.01); *H04W 64/003* (2013.01)

(58) Field of Classification Search
CPC ....... H04W 64/00; H04W 4/90; H04W 76/50; H04W 88/06; H04W 88/04; H04W 16/28;
(Continued)

(56) References Cited

U.S. PATENT DOCUMENTS

2011/0250927 A1* 10/2011 Nakada ................. H04W 52/50
455/525
2014/0036715 A1* 2/2014 Chung .................. H04W 52/20
370/252

(Continued)

FOREIGN PATENT DOCUMENTS

EP 2469298 A1 6/2012
JP 2010239331 A 10/2010

*Primary Examiner* — Joseph Arevalo
(74) *Attorney, Agent, or Firm* — Alan D. Kamrath; Karin L. Williams; Mayer & Williams PC (57) ABSTRACT

A dynamic power positioning method and a dynamic power positioning system thereof are disclosed. The method comprises the steps of: controlling a device to be measured to transmit a plurality of positioning signals with a plurality of transmission powers; making a plurality of known location devices to receive the plurality of positioning signals, and recording the intensities and the corresponding reception times of the plurality of positioning signals, and the coordinates of the plurality of known location devices to the database; finding out the known location device corresponding to a positioning signal having a higher signal intensity among the received plurality of positioning signals; obtaining a signal intensity-distance function and a signal intensity-distance standard deviation function from the database; and finding out the device location of the device to be measured according to the signal intensity-distance function and signal intensity-distance standard deviation function.

8 Claims, 6 Drawing Sheets

(51) Int. Cl.
*G01S 11/06* (2006.01)
*G01S 7/4912* (2020.01)
*H04W 64/00* (2009.01)

(58) Field of Classification Search
CPC ....... H04W 28/04; H04W 4/02; H04W 4/027; H04W 4/40; H04W 4/44; H04W 24/00; H04W 48/08; H04W 4/025; H04W 4/029; H04W 4/33; H04W 52/242; H04W 64/003; H04W 72/0473; H04W 72/085
USPC ............ 455/456.1, 456.2, 457, 67.11, 404.2, 455/127.1, 418, 66.1
See application file for complete search history.

(56) References Cited

U.S. PATENT DOCUMENTS

| | | | |
|---|---|---|---|
| 2014/0119222 A1* | 5/2014 | Chung | H04W 24/06 370/252 |
| 2016/0262067 A1* | 9/2016 | Hara | H04W 36/36 |
| 2018/0213356 A1 | 7/2018 | Singamsetty et al. | |
| 2019/0331760 A1 | 10/2019 | Nishimura et al. | |
| 2020/0077273 A1* | 3/2020 | Cherian | H04W 16/14 |
| 2020/0154443 A1* | 5/2020 | Patil | H04W 72/005 |

* cited by examiner

DYNAMIC POWER POSITIONING METHOD AND DYNAMIC POWER POSITIONING SYSTEM THEREOF

BACKGROUND OF THE INVENTION

Field of the Invention

The present invention relates to a dynamic power positioning method and a dynamic power positioning system thereof, and more particularly, to a dynamic power positioning method and a dynamic power positioning system using signals of different powers for positioning.

Description of the Prior Art

Traditionally, trilateration is often used as the positioning method for indoor device, wherein the distance required for trilateration is usually calculated using signal intensity or time of arrival (ToA). Therefore, the accuracy of the signal intensity or the time-of-arrival calculation will affect the inferred distance, and thus the accuracy of the trilateral positioning. The positioning methods in the prior art all rely on fixed-power transmitting signals. When the positioning method is based on fixed-power transmitting signals, the positioning accuracy is limited by a decaying form of a single power signal.

Today's mobile devices such as mobile phones are often equipped with various sensors with different functions. Sensors such as gyroscopes and electronic compasses can assist and improve positioning accuracy. However, considering the cost of the device, the indoor positioning device may not be equipped with these sensors and can only rely on signal intensities to estimate distance and use this data for positioning without the aid of sensors. Nevertheless, in the prior art, the signal intensity of the Bluetooth device often changes greatly, resulting in a high positioning error.

Therefore, it is necessary to propose a new dynamic power positioning method and a dynamic power positioning system thereof to solve the problems encountered in the prior art.

SUMMARY OF THE INVENTION

It is an object of the present invention to provide a dynamic power positioning method, which can achieve the effect of using signals with different powers for positioning.

It is another object of the present invention to provide a dynamic power positioning system for the dynamic power positioning method.

In order to achieve the above objects, the present invention provides a dynamic power positioning method used in a dynamic power positioning system to find out a device location of a device to be measured in a space, wherein the space further comprises a plurality of known location devices, the method comprises the steps of: controlling the device to be measured to transmit a plurality of positioning signals with a plurality of transmission powers; making the plurality of known location devices to receive the plurality of positioning signals, and recording intensities of the plurality of positioning signals, corresponding reception times of the plurality of positioning signals, and coordinates of the plurality of known location devices to a database; finding out the known location device corresponding to a positioning signal having a higher signal intensity among the received plurality of positioning signals; obtaining a signal intensity-distance function and a signal intensity-distance standard deviation function from the database; and finding out the device location of the device to be measured according to the signal intensity-distance function and signal intensity-distance standard deviation function.

The dynamic power positioning system of the present invention comprises a processing module, a database, and a computing module. The processing module controls the device to be measured to transmit a plurality of positioning signals with a plurality of transmission powers, and makes the plurality of known location devices to receive the plurality of positioning signals. The database is electrically connected with the processing module and used for storing a signal intensity-distance function and a signal intensity-distance standard deviation function, and recording intensities of the plurality of positioning signals, corresponding reception times of the plurality of positioning signals; and coordinates of the plurality of known location devices after the plurality of known location devices has received the plurality of positioning signals, so that the processing module can find out the known location devices corresponding to a positioning signal having a higher signal intensity among the received plurality of positioning signals. The computing module is electrically connected with the database for finding out the device location of the device to be measured by querying the signal intensity-distance function and signal intensity-distance standard deviation function based on the intensities of the plurality of positioning signals, the corresponding reception times of the plurality of positioning signals, and the coordinates of the plurality of known location devices with higher signal intensities.

DETAILED DESCRIPTION OF THE EMBODIMENTS

In order to make the structure and characteristics as well as the effectiveness of the present invention to be further understood and recognized, the detailed description of the present invention is provided as follows along with embodiments and accompanying figures.

Figure 1:
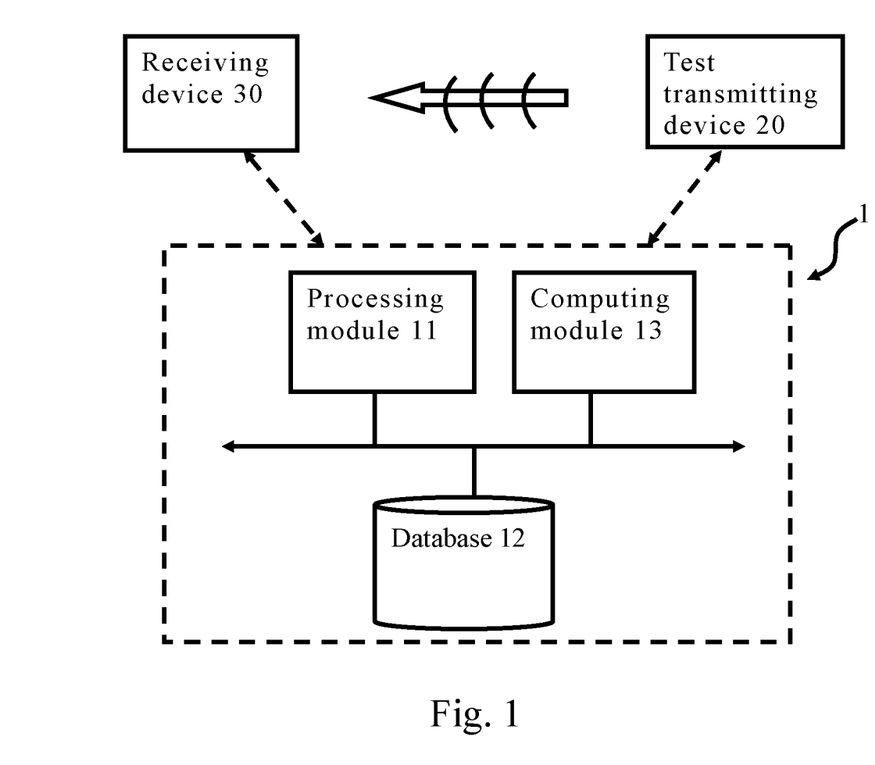
FIG. 1 illustrates a system architecture diagram of the dynamic power positioning system executing a setting process of the present invention.

Please refer to FIG. 1 for a system architecture diagram of the dynamic power positioning system executing a setting process of the present invention.

Figure 3:
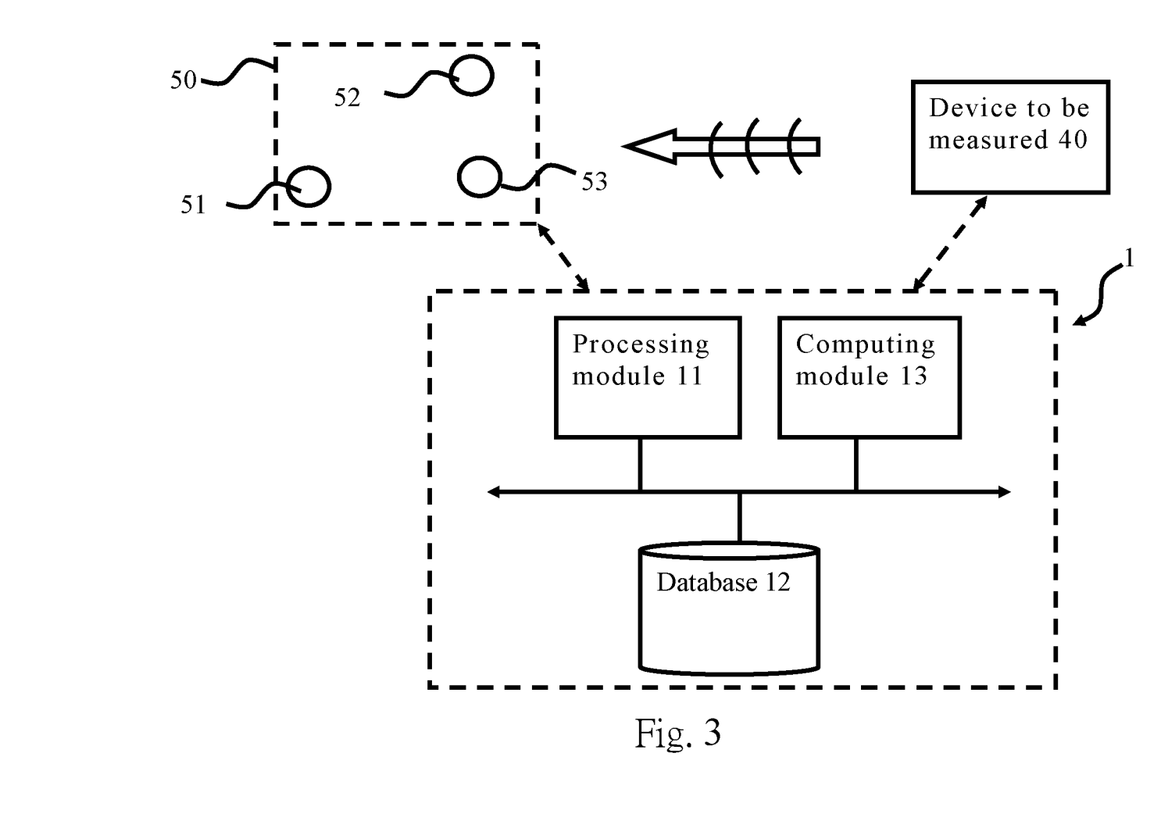
FIG. 3 illustrates a system architecture diagram of the dynamic power positioning system executing a positioning process of the present invention.

In an embodiment of the present invention, the dynamic power positioning system 1 includes a processing module 11, a database 12, and a computing module 13 which are electrically connected with each other. The dynamic power positioning system 1 is used for finding out a device location of a device to be measured 40 by using a known location device 50 (as shown in FIG. 3) in a space. Before the device to be measured 40 is found, the dynamic power positioning system 1 can also use a test transmitting device 20 and receiving device 30 to establish the required data, but the present invention is not limited thereto. The test transmitting device 20, the receiving device 30, the device to be measured 40, and the known location device 50 can send and receive wireless signals, which can be Bluetooth signals, and the test transmitting device 20, the receiving device 30, the device to be measured 40, and the known location device 50 may also be the same or different home appliances, computer devices, or mobile devices, but the present invention is not limited thereto.

It is noted that each module of the dynamic power positioning system 1 can be constructed by hardware devices, software programs combined with hardware devices, or firmware combined with hardware devices. For example, a computer program product stored in a computer-readable medium can be read to execute various functions of the invention, but the invention is not limited to the above-mentioned manner. Furthermore, this embodiment only exemplifies a preferred embodiment of the present invention. In order to avoid redundant descriptions, all possible combinations of changes are not described in detail. However, those skilled in the art should understand that the above modules or components may not be necessary. In order to implement the present invention, other more detailed conventional modules or components may also be included. Each module or component may be omitted or modified as required, and there may not be other modules or components between any two modules. The processing module 11, the database 12 or the computing module 13 can be disposed in the same device or in different devices, or can be disposed in any one of the test transmitting device 20, the receiving device 30, the device to be measured 40, or the known location device 50, but the present invention is not limited thereto.

Therefore, in an embodiment of the present invention, the processing module 11 sets a plurality of transmission powers of the test transmitting device 20, so the test transmitting device 20 can transmit a plurality of test signals. Then the processing module 11 makes the receiving device 30 to receive the plurality of test signals at a plurality of corresponding distances from the test transmitting device 20, for example, at a distance of 10 cm, 20 cm, or 1 m to 6 m, wherein different test signals are transmitted with different transmission powers. However, the present invention is not limited to the values stated above. Accordingly, the processing module 11 detects and obtains the plurality of test signal intensities received by the receiving device 30, so as to record the plurality of test signal intensities and the plurality of corresponding distances to the database 12. Finally, the computing module 13 calculates the signal intensity-distance function and the signal intensity-distance standard deviation function based on the values of the database 12, and stores them back to the database 12.

Figure 2:
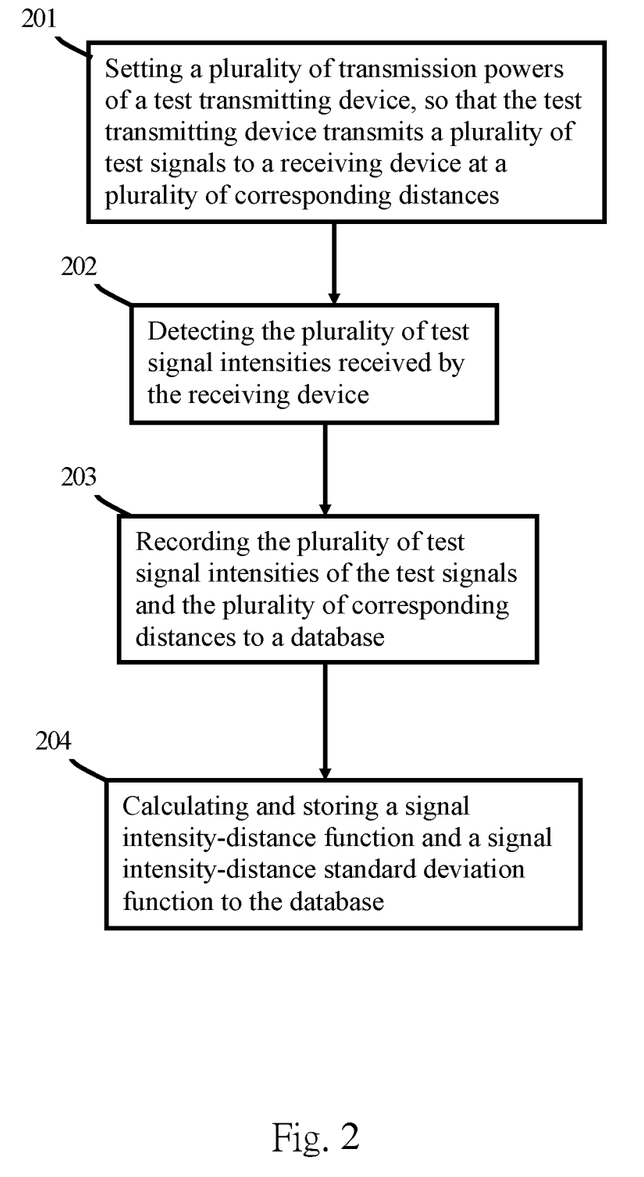
FIG. 2 illustratesa flowchart of the data setting process of the present invention.

Now please refer to FIG. 2 for a flowchart of the data setting process of the present invention. It is noted that although the dynamic power positioning system 1 described above is used as an example to describe the data setting process of the present invention, the data setting process of the present invention is not limited to the use of the dynamic power positioning system 1 of the same structure as above.

First, the method proceeds to step 201: setting a plurality of transmission powers of a test transmitting device, so that the test transmitting device transmits a plurality of test signals to a receiving device at a plurality of corresponding distances.

First, the processing module 11 sets a plurality of transmission powers of the test transmitting device 20. Therefore, the test transmitting device 20 can transmit a plurality of test signals, and then the receiving device 30 receives the plurality of test signals at different distances of, for example, 10 cm, 20 cm, or 1 meter to 6 meters from the test transmitting device 20.

Then the method proceeds to step 202: detecting the plurality of test signal intensities received by the receiving device.

Then the processing module 11 detects all the test signal intensities received by the receiving device 30.

Then the method proceeds to step 203: recording the plurality of test signal intensities of the test signals and the plurality of corresponding distances to a database.

Then the processing module 11 records all the test signal intensities of the test signals and the corresponding distances to the database 12.

Finally the method proceeds to step 204: calculating and storing a signal intensity-distance function and a signal intensity-distance standard deviation function to the database.

Finally, the computing module 13 can calculate a signal intensity-distance function and a signal intensity-distance standard deviation function for each transmission power according to all the signal intensities of the test signals and the corresponding distances, so that the computing module 13 can obtain the relationship between the signal intensity received by the receiving device 30 and the distance between the receiving device 30 and the test transmitting device 20, and its standard deviation. This relationship can be stored in the database 12. In this way, the data setting process of the present invention is completed.

Next, please refer to FIG. 3 for a system architecture diagram of the dynamic power positioning system executing a positioning process of the present invention.

After establishing the signal intensity-distance function and the signal intensity-distance standard deviation function in the database 12, the dynamic power positioning system 1 can use a known location device 50 to find a device location of the device to be measured 40 in the space. It is noted that although in one embodiment of the present invention, the signal intensity-distance function and the signal intensity-distance standard deviation function are obtained by directly performing the data setting process first, the present invention is not limited to performing the data setting process every time to re-create the signal intensity-distance function and the signal intensity-distance standard deviation function in the database 12. The signal intensity-distance function and the signal intensity-distance standard deviation function can be preset in the device to be measured 40 or the known location device 50.

Hence, the processing module 11 controls the device to be measured 40 to transmit a plurality of positioning signals with a plurality of transmission powers, and makes the plurality of known location devices 50 to receive the plurality of positioning signals and to record the intensities of the plurality of positioning signals, the corresponding reception times of the plurality of positioning signals, and the locations of the plurality of known location device 50 to the database 12. The plurality of known location devices 50 also receive an identification code of the device to be measured 40, thereby identifying the device to be measured 40. This identification code is also stored in the database 12. Therefore, the processing module 11 finds out known devices with higher signal intensities, such as the known location devices 51, 52, 53, according to the received plurality of positioning signals. Finally, the computing module 13 can find out the location of the device to be measured 40 by the signal intensity-distance function and the signal intensity-distance standard deviation function based on the device locations of known location devices 51, 52, 53.

Figure 4:
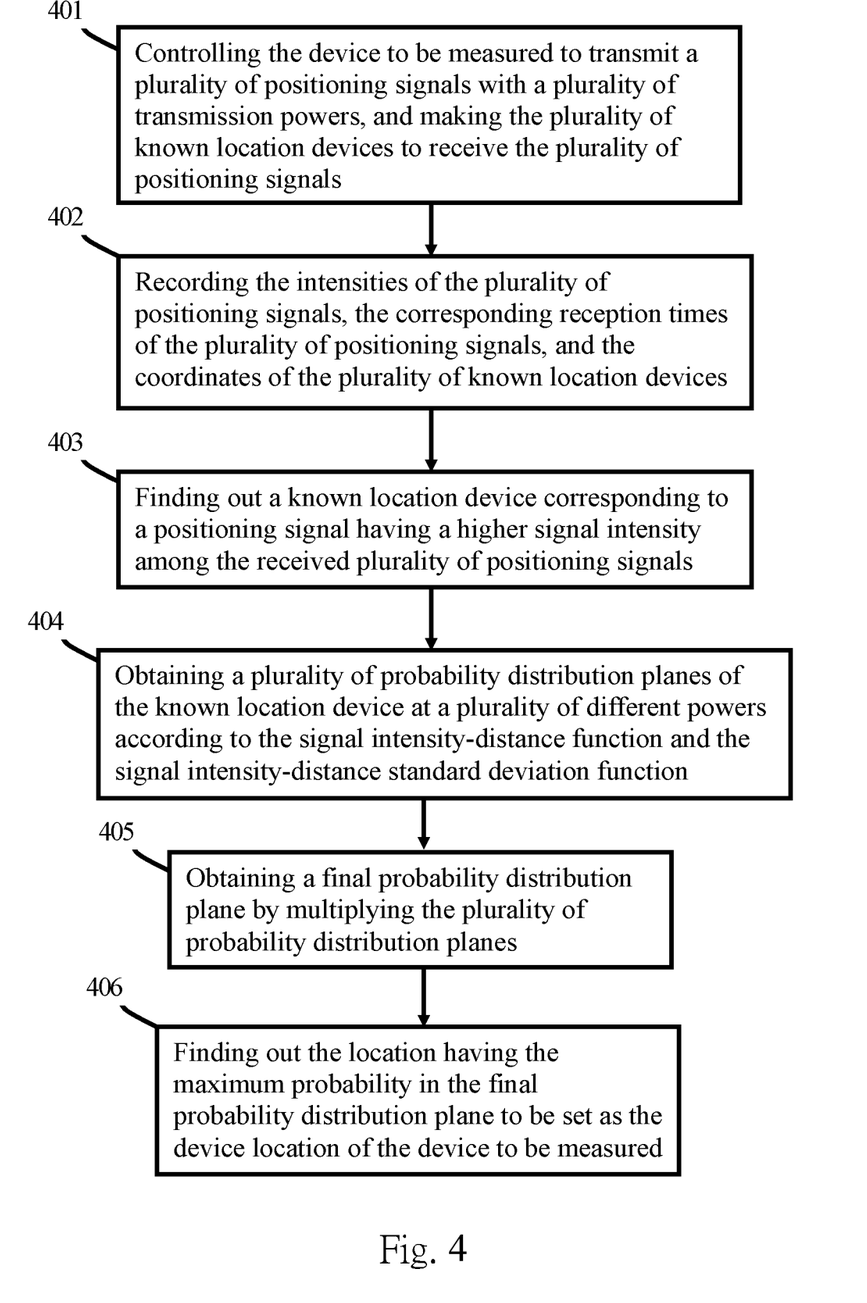
FIG. 4 illustrates a flowchart of the dynamic power positioning method of the present invention.

For a detailed description of the method of finding the device location of the device to be measured 40, please refer to FIG. 4 for a flowchart of the dynamic power positioning method of the present invention First the method proceeds to step 401: controlling the device to be measured to transmit a plurality of positioning signals with a plurality of transmission powers, and making the plurality of known location devices to receive the plurality of positioning signals.

First, when the device to be measured 40 enters a space, the processing module 11 must first control the device to be measured 40 to transmit a plurality of positioning signals with different transmission powers, so that the plurality of known location devices 50 can receive the plurality of positioning signal of the device to be measured 40. The plurality of known location devices 50 also receives an identification code of the device to be measured 40.

Then the method proceeds to step 402: recording the intensities f the plurality of positioning signals, the corresponding reception times of the plurality of positioning signals, and the coordinates of the plurality of known location devices.

Since the device to be measured 40 transmits the plurality of positioning signals with different transmission powers, after the plurality of known location devices 50 receives the positioning signals, the known location device 50 will send all the intensities of the plurality of positioning signals, the corresponding reception times of the plurality of positioning signals, and the coordinates of the plurality of known location devices to the database 12.

Then the method proceeds to step 403: finding out a known location device corresponding to a positioning signal having a higher signal intensity among the received plurality of positioning signals.

The processing module 11 will find out the known location devices 51, 52, 53 corresponding to the positioning signals having higher signal intensities among the plurality of positioning signals in the database 12.

Then the method proceeds to step 404: obtaining a plurality of probability distribution planes of the known location device at a plurality of different powers according to the signal intensity-distance function and the signal intensity-distance standard deviation function.

The computing module 13 can then query the signal intensity-distance function and the signal intensity-distance standard deviation function according to the intensities of the plurality of positioning signals, the corresponding reception times of the plurality of positioning signals, and the coordinates of the plurality of known location devices having higher signal intensities, by using the fixed coordinates of known location device 51, 52, 53 as the centers of the circles, the distances under the signal intensities are obtained according to the signal intensity-distance function respectively, that is, the distances are set as the base radiuses. Then the signal intensity-distance standard deviation function is used for obtaining the distance standard deviations under the signal intensities, which is, setting the standard deviations as the basis for radius adjustments. Based on the base radiuses and the standard deviations, the probability distribution planes of the known location devices 51, 52, 53 at different powers are calculated.

Figure 5A:
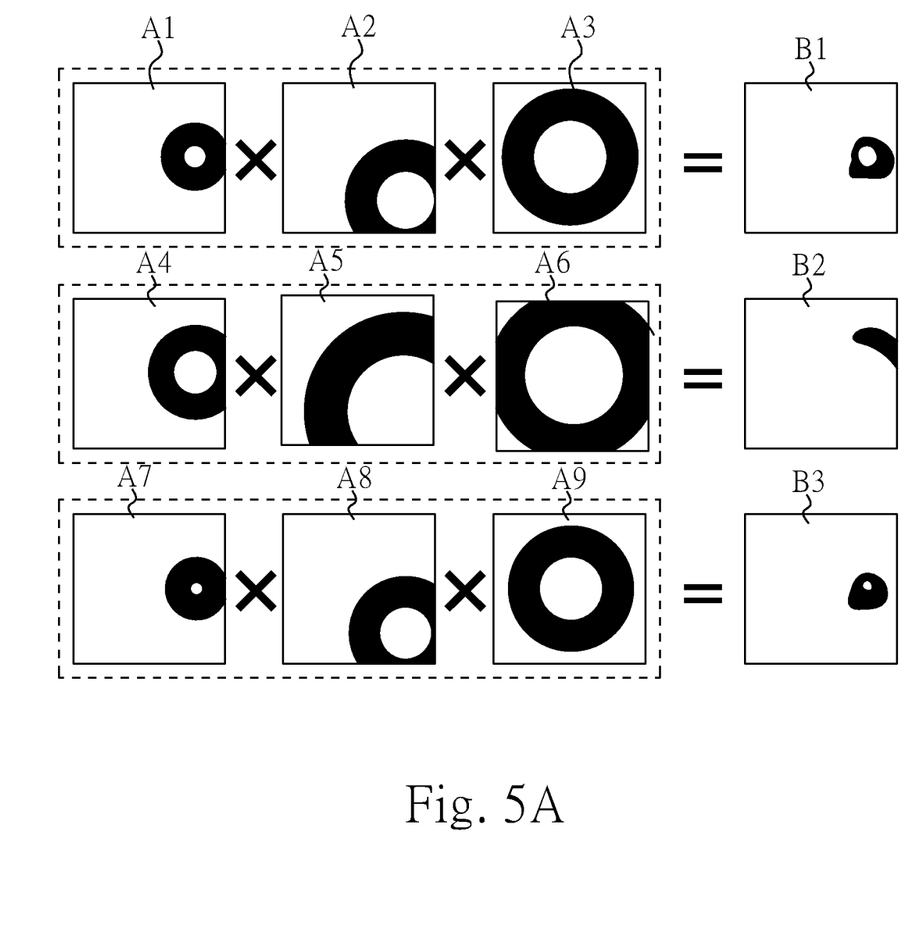
FIGS. 5A-5B are base to FIG. 4 to illustrate schematic diagrams related to probability distributions of the dynamic power positioning method of the present invention.
Figure 5B:
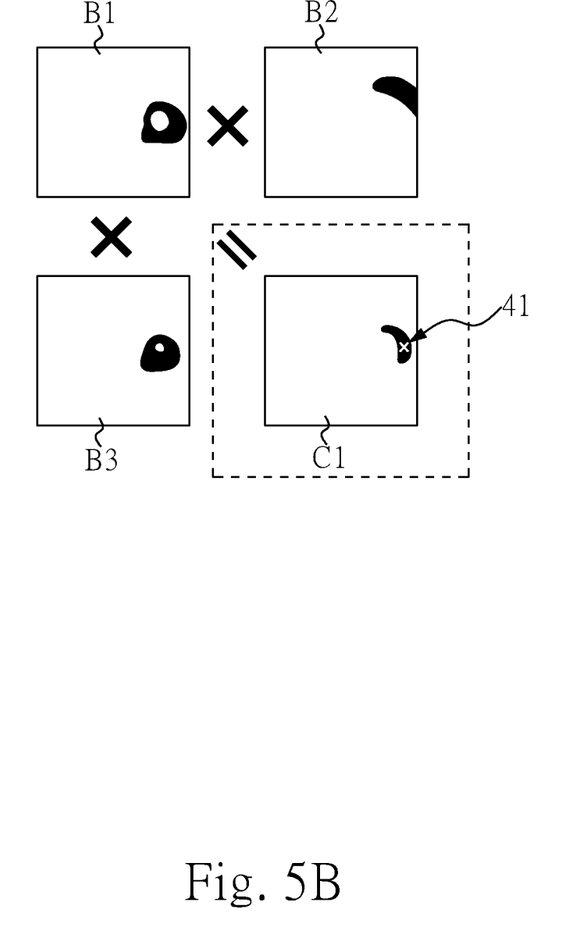

At this time, please refer to FIGS. 5A-5B are base to FIG. 4, to illustrate schematic diagrams related to probability distributions of the dynamic power positioning method of the present invention.

For example, in this embodiment, the nine probability distribution planes A1 to A9 that are possible for the plurality of positioning signals received by the known location devices 51, 52, 53 can be obtained at high, medium, and low powers. Among them, the probability distribution planes A1 to A3 are known location devices 51, 52, 53 at high power, the probability distribution planes A4 to A6 are known location devices 51, 52, 53 at medium power, and the probability distribution planes A7 to A9 are known location devices 51, 52, 53 at low power respectively.

Then the method proceeds to step 405: obtaining a final probability distribution plane by multiplying the plurality of probability distribution planes.

Next, the computing module 13 multiplies the nine probability distribution planes A1 to A9, that is, the probability distribution planes A1 to A3 are first multiplied to obtain the calculated probability distribution plane B1, the probability distribution planes A4 to A6 are multiplied to obtain the calculated probability distribution plane B2, and the probability distribution planes A7 to A9 are multiplied to obtain the calculated probability distribution plane B3. Finally, the calculated probability distribution planes B1 to B3 are multiplied to obtain the final probability distribution plane C1.

Finally the method proceeds to step 406: finding out the location having the maximum probability in the final probability distribution plane to be set as the device location of the device to be measured.

Finally, the computing module 13 finds out the location having the maximum probability from the final probability distribution plane C1, and sets the location having the maximum probability as the device location 41 of the device to be measured 40, and the coordinate of the device to be measured 40 can be obtained.

It is noted that the dynamic power positioning method of the present invention is not limited to the above-mentioned order of steps, as long as the purpose of the present invention can be achieved, the above-mentioned order of steps can also be changed.

By using the dynamic power positioning method and the dynamic power positioning system 1 of the present invention, the position of the device to be measured 40 can be effectively found without installing any additional sensing modules.

Moreover, the embodiments merely described preferred embodiments of the present invention, and the present invention is not to be construed as being limited by these embodiments. To avoid redundant description, not all possible variations and combination are recited in detail. However, a person skilled in the art could understand that not all of the modules or components above are necessary. In addition, other detailed conventional modules or components may be included in order to implement the present invention. The modules and components can be omitted or modified according to requirements, and other modules or components can possibly exist between any two modules. Forms that do not depart from the fundamental architecture of the present invention are to be regarded within the claimed scope of the present invention, and the claimed scope should be accorded with the appended claims.

What is claimed is:

1. A dynamic power positioning method used in a dynamic power positioning system to find out a device location of a device to be measured in a space, wherein the space further comprises a plurality of known location devices, the method comprises the steps of:

controlling the device to be measured to transmit a plurality of positioning signals with a plurality of transmission powers;

making the plurality of known location devices to receive the plurality of positioning signals, and recording intensities of the plurality of positioning signals, corresponding reception times of the plurality of positioning signals, and coordinates of the plurality of known location devices to a database;

finding out a plurality of known location devices corresponding the plurality of positioning signals with higher signal intensities among the received plurality of positioning signals;

obtaining a signal intensity-distance function and a signal intensity-distance standard deviation function from the database;

obtaining a plurality of probability distribution planes of the plurality of known location devices with higher signal intensities at a plurality of different transmission powers according to the signal intensity-distance function and the signal intensity-distance standard deviation function;

obtaining a final probability distribution plane by multiplying the plurality of probability distribution planes with each other; and finding out a location having a maximum probability in the final probability distribution plane to be set as the device location of the device to be measured.

2. The dynamic power positioning method as claimed in claim 1 further comprising the step of finding out three known location devices with higher signal intensities.

3. The dynamic power positioning method as claimed in claim 1 further comprising the step of receiving an identification code of the device to be measured.

4. The dynamic power positioning method as claimed in claim 1 further comprising a step of performing a data setting process, wherein the data setting process comprises:

setting a plurality of transmission powers of a test transmitting device so that the test transmitting device transmits a plurality of test signals to a receiving device at a plurality of corresponding distances, wherein different test signals correspond to different transmission powers;

detecting intensities of the plurality of test signals received by the receiving device;

recording the intensities of the plurality of test signals and the plurality of corresponding distances to the database; and calculating and storing the signal intensity-distance function and the signal intensity-distance standard deviation function to the database.

5. A dynamic power positioning system for finding out a device location of a device to be measured in a space, wherein the space further comprises a plurality of known location devices, the dynamic power positioning system comprises:

a processing module for controlling the device to be measured to transmit a plurality of positioning signals with a plurality of transmission powers, and making the plurality of known location devices to receive the plurality of positioning signals;

a database electrically connected with the processing module and used for storing a signal intensity-distance function and a signal intensity-distance standard deviation function, and recording intensities of the plurality of positioning signals, corresponding reception times of the plurality of positioning signals, and coordinates of the plurality of known location devices after the plurality of known location devices has received the plurality of positioning signals, so that the processing module finds out a plurality of known location devices corresponding the plurality of positioning signals with higher signal intensities among the received plurality of positioning signals; and a computing module electrically connected with the database for finding out the device location of the device to be measured by querying the signal intensity-distance function and signal intensity-distance standard deviation function based on the intensities of the plurality of positioning signals, the corresponding reception times of the plurality of positioning signals, wherein the processing module obtains a plurality of probability distribution planes of the plurality of known location device with higher signal intensities at a plurality of different transmission powers according to the signal intensity-distance function and the signal intensity-distance standard deviation function, the computing module obtains a final probability distribution plane by multiplying the plurality of probability distribution planes with each other, and finds out a location having a maximum probability in the final probability distribution plane to be set as the device location of the device to be measured.

6. The dynamic power positioning system as claimed in claim 5, wherein the processing module is used for finding out three known location devices with higher signal intensities.

7. The dynamic power positioning system as claimed in claim 5, wherein the dynamic power positioning system is provided for receiving an identification code of the device to be measured.

8. The dynamic power positioning system as claimed in claim 5, wherein the processing module sets a plurality of transmission powers of a test transmitting device so that the test transmitting device transmits a plurality of test signals to a receiving device at a plurality of corresponding distances, wherein different test signals correspond to different transmission powers, when the processing module detects the intensities of the plurality of test signals received by the receiving device, the processing module records the intensities of the plurality of test signals and the plurality of corresponding distances to the database so that the computing module calculates and stores the signal intensity-distance function and the signal intensity-distance standard deviation function to the database.

* * * * *